Figure 1:
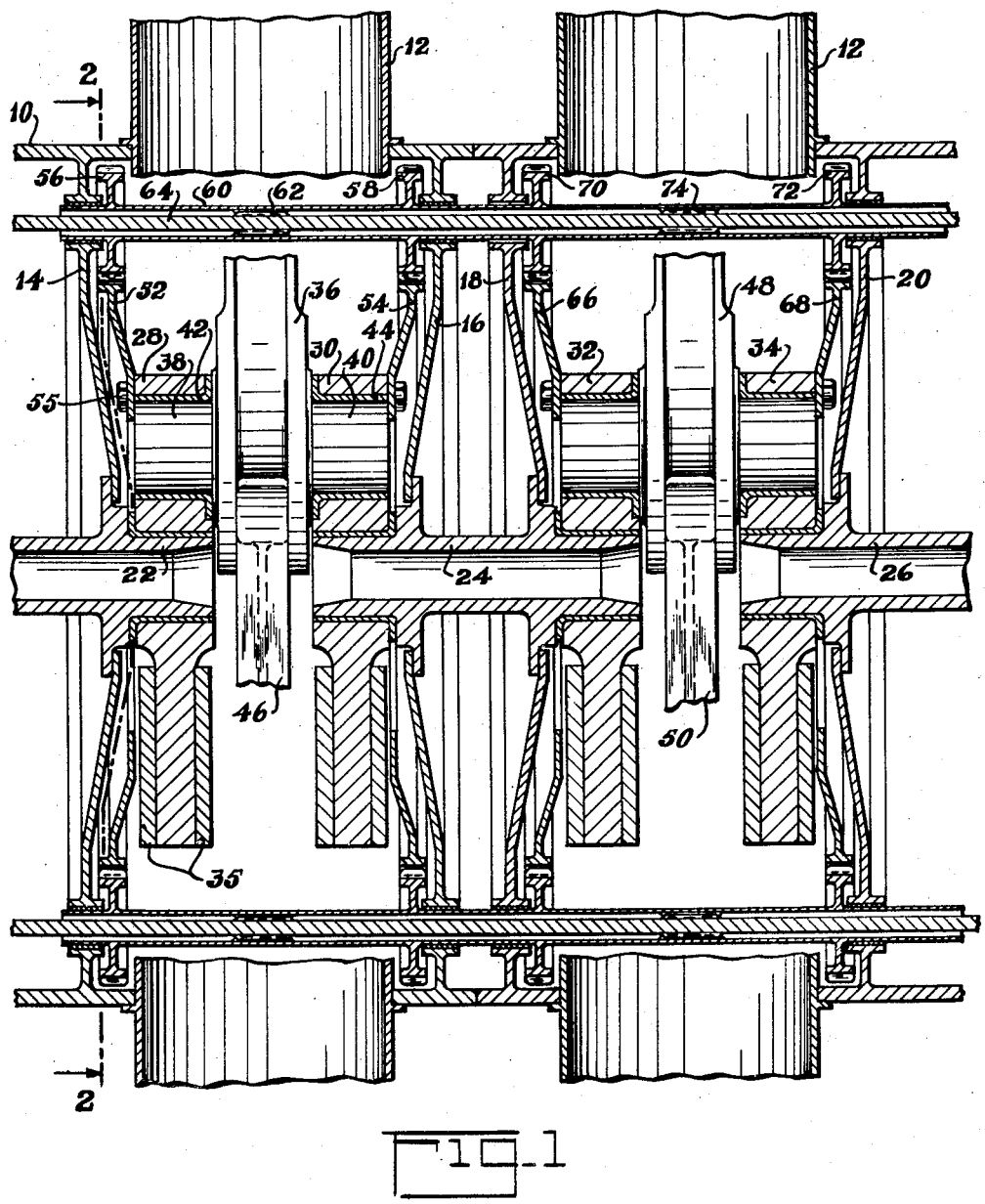

Aug. 16, 1949.　　　　　V. T. MOORE　　　　　2,479,249
INTERNAL-COMBUSTION ENGINE CRANKSHAFT AND GEARING

Filed June 26, 1944　　　　　　　　　　　　　2 Sheets-Sheet 1

INVENTOR.
VINCENT T. MOORE.

BY
ATTORNEY

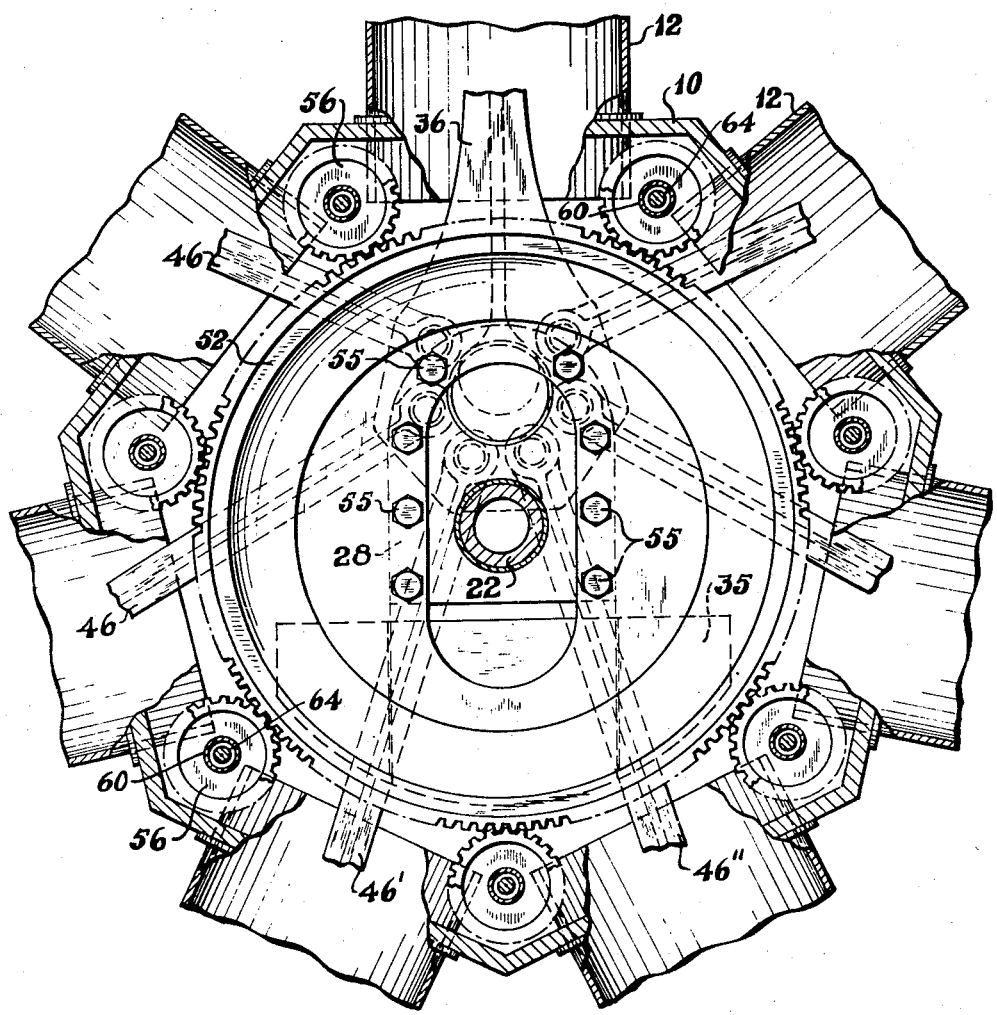

UNITED STATES PATENT OFFICE 2,479,249

INTERNAL-COMBUSTION ENGINE CRANK-SHAFT AND GEARING

Vincent T. Moore, Ridgewood, N. J., assignor to Wright Aeronautical Corporation, a corporation of New York Application June 26, 1944, Serial No. 542,084

2 Claims. (Cl. 74—389)

This invention relates to internal combustion engines, and is particularly directed to improvements in the crank shaft and connecting rod arrangement of such an engine. The invention is described in connection with an internal combustion engine of the radial cylinder type; however, the invention is not so limited, but is of general application.

The conventional crank shaft of an internal combustion engine is either made in one piece or the crank shaft comprises one or more sections clamped or otherwise secured together. In either case the crank shaft comprises shaft-like portions co-axial with the crank shaft axis and rotatable thereabout together with one or more eccentric crank pins connected to said portions by crank cheeks. It is an object of this invention to simplify the aforesaid crank shaft construction. It is a further object of this invention to provide a crank shaft which merely consists of a pair of crank cheeks for each crank shaft throw, the crank cheeks being piloted about the crank shaft axis and each being geared to one or more propeller shafts. Besides simplifying the usual crank shaft, this multi-section crank shaft construction has the further advantage in that it eliminates the clamp joints necessary in the conventional multi-section crank shaft. Furthermore, with the conventional integral multi-throw crank shaft, the load of each crank throw is transmitted through the crank shaft; whereas with the present invention, each crank throw transmits its power to the propeller shaft or shafts independently of the other crank throws, thereby reducing the otherwise necessary size and weight of the crank shaft.

In the conventional crank shaft construction the crank shaft bearings are axially offset relative to the plane of the crank cheeks whereupon the crank cheeks are subjected to bending moments during engine operation because of this offset. It is a further object of this invention to dispose the crank shaft bearing supports in the planes of rotation of the respective crank cheeks in order to minimize such bending moments. This arrangement eliminates the bending moment in each of the crank cheeks in any plane parallel to the crank shaft axis except that introduced by bending of the crank pin, and as a result, each crank cheek principally is subjected only to bending moments in its plane of rotation. It is a further object of this invention to drivably connect each pair of crank cheeks to a propeller shaft in such a manner that there is no relative rotation between the crank cheeks of each pair because of torsional twisting of the propeller shaft under load, whereby the crank cheeks of each pair are maintained in phase with each other.

It is a further object of this invention to reduce the diameter of the connecting rod hub. In the conventional crank shaft construction, the connecting rod hub is hollow and is journaled about a crank pin. In the present invention, the connecting rod hub is provided with a pair of opposed projecting bosses journaled to the adjacent crank cheeks. With this arrangement, the hub of the connecting rod can be made quite small in comparison with the conventional connecting rod hub which is adapted to be journaled about a crank pin. This small diameter hub construction is particularly important for radial cylinder engines employing a master connecting rod because it is then possible to pivotly connect the auxiliary connecting rods thereto relatively close to the axis of the master rod hub, particularly the auxiliary connecting rods most remote from the master rod. In this way, the motions of the master connecting rod and its associated auxiliary connecting rods are more nearly alike.

Other objects of this invention will become apparent upon reading the annexed detailed description in connection with the drawing in which:

Figure 1 is a partial axial section through a radial cylinder engine embodying the invention; and Figure 2 is a sectional view taken along line 2—2 of Figure 1.

Referring to the drawing, a radial cylinder engine is provided with a sectional tubular crank case 10 about which the cylinders 12 are radially mounted. As illustrated, two banks of cylinders have been radially mounted about the crank case. However, the invention is not limited to any particular number of cylinders or cylinder banks, and is equally applicable to an engine comprising but one radial bank of cylinders or any other number of cylinder banks. The banks of cylinders are disposed in tandem relation, thereby defining a plurality of in-line cylinder rows spaced about the axis of said crank case.

The crank case 10 is provided with transverse supporting webs 14, 16, 18 and 20 to which coaxial bearing members 22, 24 and 26 are secured. A pair of adjacent crank cheeks 28 and 30 are journaled about the bearing members 22 and 24 respectively and a pair of crank cheeks 32 and 34 are journaled about the bearing members 24 and 26 respectively. Counterweights 36 are pivotly supported by each crank cheek in the usual manner for absorbing the torsional vibrations in the crank shaft system, e. g., see R. Chilton's Patent No. 2,112,984. In this way the crank cheeks are each supported by bearings disposed in their respective planes of rotation, thereby avoiding bending stresses occurring in the conventional crank shaft construction because of the usual axial offset between the crank shaft bearings and the crank cheeks.

A master connecting rod 36 is provided with a hub having opposed co-axially projecting bosses or posts 38 and 40 which are journaled within axially aligned bearing openings 42 and 44 in the crank cheeks 28 and 30 respectively. In this way, the hub of the master rod in effect comprises the crank pin between the crank cheeks 28 and 30. A plurality of auxiliary connecting rods 46 are pivotly connected to the master rod hub and the outer ends of the master rod and auxiliary connecting rods are connected to pistons (not shown) slidable within the cylinders 12. In the usual construction, the master rod hub must have a diameter sufficient to permit the hub to be journaled about a crank pin. However, with the present construction, the hub of the master rod itself forms the crank pin, and therefore can be made quite small in diameter. As a result, the auxiliary connecting rods can be pivoted quite close to the axis of the master rod hub. Accordingly, this construction minimizes the eccentricity of the auxiliary connecting rods, and therefore provides for a more uniform connecting rod motion. Also, since the motion of the auxiliary connecting rods serving the cylinders most remote from the master rod cylinder, deviates most from the master rod motion, these remote auxiliary connecting rods are articulated closest to the axis of the master rod hub in order to minimize this difference. Thus, as illustrated in Figure 2, the remote auxiliary connecting rods 46' and 46" are pivotly connected to the master rod hub closest to its axis, while the auxiliary connecting rods adjacent to the master rod have their pivotal connection to the master rod hub most removed from the axis of said hub. Similarly, a master rod 48 is provided with opposed projecting bosses or posts which are journaled within axially aligned bearing openings in the crank cheeks 32 and 34, and auxiliary connecting rods 50 are articulated to said master connecting rod 48.

Another advantage of applicant's master rod construction is that improved bearing performance is possible because the bearings posts 38 may be considerably more rigid than the annular hub of a conventional master rod. In addition, the master rod bearing performance is further improved because of the fact that during engine operation the conventional annular master rod hub is subjected to varying forces from the various auxiliary connecting rods tending to distort this hub; whereas with the present construction, the portion of the master rod hub about which the auxiliary connecting rods are articulated may be solid and also the bearing posts are offset from the lines of action of the auxiliary connecting rod forces.

Gears 52 and 54 are secured by bolts 55 or other securing means to crank cheeks 28 and 30, and these gears are respectively meshed with gears 56 and 58 carried by a tubular lay shaft 60. A plurality of such lay shafts 60 and associated gears are provided, and these lay shafts are circumferentially spaced and compactly disposed within the crank shaft between the in-line radially disposed cylinder rows. Each of the lay shafts 60 is hollow and is provided with internal splines 62 midway between gears 56 and 58, and these splines 62 drivably connect each hollow lay shaft 60 to a lay shaft 64 disposed therewithin. In this way, the load from the master rod 36 and its associated auxiliary connecting rods is transferred to the hollow lay shafts 60 through the pair of crank cheeks 28 and 30, gears 52 and 54 and gears 56 and 58 respectively. From the hollow lay shafts 60 torque is transmitted to the internal lay shafts 64 through splines 62 disposed midway between gears 56 and 58. Then, since the crank cheeks 28 and 30 transmit substantially equal torque, this construction insures equal deflection of the crank cheeks 28 and 30 under load to maintain their bearings 42 and 44 in axial alignment. From the plurality of lay shafts 64, torque is transmitted to one or more engine propeller shafts (not shown) in any suitable manner.

Similarly, gears 66 and 68 are bolted or otherwise secured to the crank cheeks 32 and 34. These gears are respectively disposed in meshing engagement with gears 70 and 72, carried by each of the hollow lay shafts 60. Each of the lay shafts 60 is also splined to its associated internal lay shaft 64 at splines 74 disposed midway between gears 70 and 72. The pistons of additional banks of radially disposed cylinders may be similarly connected to the lay shafts 64.

It is possible to eliminate the internal lay shafts 64 by providing a lay shaft 60 with sufficient torsional rigidity such that the relative angular deflection between gears 56 and 58 or between gears 70 and 72 is small enough to keep their associated pairs of crank cheeks substantially in phase.

With the present invention, the crank shaft construction has been materially simplified and merely consists of a pair of crank cheeks for each crank throw. In addition, each master connecting rod is provided with projecting posts journaled within the adjacent crank cheeks. This latter feature reduces the size of the master rod hub, thereby permitting the auxiliary connecting rods to be articulated close to the axis of the master rod hub, and in this way reducing the eccentricity of the auxiliary connecting rods. Furthermore, the reduction in size of the master rod hub reduces the magnitude of the rotating masses coupled to the crank shaft system.

In a conventional crank shaft construction, the crank cheeks are subjected to bending stresses during engine operation because of the axial spacing between the crank shaft bearings and the various crank cheeks. With the present invention, these bending stresses are eliminated, since each crank cheek has a bearing support directly in its plane of rotation.

While I have described my invention in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In an engine, a pair of spaced crankcheeks, a pair of alined supports for and co-axial with said crankcheeks, each of said supports providing an annular bearing for one of said crankcheeks substantially in its plane of rotation, a connecting rod having a hub portion disposed between said crankcheeks, a pair of alined bearing posts rigid with and projecting oppositely from said hub portion for pivotal connection with the adjacent crankcheeks, each of said pivotal connections being disposed substantially in the plane of rotation of, and offset from, the axis of rotation of its associated crankcheek, an output shaft, and individual gearing connecting each crankcheek to said shaft.

2. In an engine, a pair of spaced crankcheeks, a pair of alined supports for and co-axial with said crankcheeks, each of said supports providing an annular bearing for one of said crankcheeks substantially in its plane of rotation, a connecting rod having a hub portion disposed between said crankcheeks, a pair of alined bearing posts rigid with and projecting oppositely from said hub portion for pivotal connection with the adjacent crankcheeks, each of said pivotal connections being disposed substantially in the plane of rotation of, and offset from, the axis of rotation of its associated crankcheek, a hollow shaft disposed parallel to the axis of said crankcheeks, a pair of gears, one for each of said crankcheeks with each gear drivably connecting its crankcheek to said hollow shaft at a point spaced from the driving connection of the other gear with said hollow shaft, and an output shaft co-axially disposed within said hollow shaft and drivably connected thereto between said spaced points.

VINCENT T. MOORE.

REFERENCES CITED

The following references are of record in the file of this patent:

UNITED STATES PATENTS

| Number | Name | Date |
| --- | --- | --- |
| 1,019,001 | Wiesengrund et al. | Feb. 27, 1912 |
| 1,275,029 | Holy | Aug. 6, 1918 |
| 1,517,199 | Delaporte | Nov. 25, 1924 |
| 1,732,424 | Young | Oct. 22, 1929 |
| 1,948,475 | Newmann | Feb. 20, 1934 |
| 2,093,997 | Butler | Sept. 28, 1937 |
| 2,297,214 | Gosslau | Sept. 29, 1942 |
| 2,340,458 | Dusevoir | Feb. 1, 1944 |

FOREIGN PATENTS

| Number | Country | Date |
| --- | --- | --- |
| 20,764 | France | June 14, 1919 |
| 78,988 | Switzerland | Feb. 17, 1919 |
| 187,960 | Great Britain | May 23, 1922 |
| 372,338 | Germany | Mar. 26, 1923 |